(12) United States Patent
Hipple et al.

(10) Patent No.: US 6,647,622 B2
(45) Date of Patent: Nov. 18, 2003

(54) REPAIRING AN ENGINE COOLING SYSTEM

(75) Inventors: Clement R. Hipple, Newtown, PA (US); Robert W. Barks, New Castle, DE (US)

(73) Assignee: SCIX, LLC, Southampton, PA (US)

( * ) Notice: Subject to any disclaimer, the term of this patent is extended or adjusted under 35 U.S.C. 154(b) by 25 days.

(21) Appl. No.: 09/998,353

(22) Filed: Nov. 30, 2001

(65) Prior Publication Data

US 2002/0073540 A1 Jun. 20, 2002

Related U.S. Application Data

(63) Continuation-in-part of application No. 09/476,265, filed on Jan. 3, 2000, now Pat. No. 6,324,757.

(51) Int. Cl.⁷ .................................................. B23P 15/00
(52) U.S. Cl. .............................. 29/888.011; 29/402.01; 29/890.031
(58) Field of Search .................... 29/888.011, 402.01, 29/402.02, 890.031; 106/33; 252/72

(56) References Cited

U.S. PATENT DOCUMENTS

| | | | |
|---|---|---|---|
| 4,708,195 A | 11/1987 | Barks | 165/41 |
| 4,765,629 A | 8/1988 | Barks | 106/33 |
| 4,765,630 A | 8/1988 | Barks | 106/33 |
| 4,973,360 A | 11/1990 | Satas | 106/33 |
| 6,159,276 A | 12/2000 | Barks | 106/33 |
| 6,324,757 B1 | 12/2001 | Barks | 29/888.011 |

*Primary Examiner*—I Cuda Rosenbaum
(74) *Attorney, Agent, or Firm*—Douglas G. Glantz

(57) ABSTRACT

A method of repairing a coolant system associated with an engine for a vehicle, including disconnecting a gooseneck connected to the engine and removing from the engine its thermostat; disconnecting a bottom radiator hose connected to the engine and flushing the engine with water; reconnecting the bottom radiator hose and reconnecting the gooseneck; refilling the engine's radiator with an antifreeze solution; opening a drain valve on the radiator and allowing a predetermined amount of coolant to drain out of the engine corresponding to a volume of a treatment composition to be added, starting the engine when the engine is cold, and turning on the engine's heater; adding the composition to the radiator of the engine while the engine is cold and idling; running the engine until the composition causes leakage and/or vapor in the engine's exhaust stream is substantially stopped; and stopping the engine and allowing the engine to cool.

16 Claims, No Drawings

REPAIRING AN ENGINE COOLING SYSTEM

This is a continuation-in-part of application Ser. No. 09/476,265 filed Jan. 3, 2000, now U.S. Pat. No. 6,324,757.

BACKGROUND OF THE INVENTION

1. Technical Field

This invention relates to a method and composition for repairing cooling systems of combustion engines and the like and particularly for sealing cracks in such devices as heating cores, freeze plugs, radiators, cracked or warped heads, and blown head gaskets.

2. Background

Sealing to repair cracks in combustion engines can utilize solid particles carried by a liquid for conveying the particles to the cracks. Solid particles can act as plugs for sealing the cracks.

INTRODUCTION TO THE INVENTION

Sealing works better on large cracks compared to very small cracks which are too small for the particles to enter. It has been found also that sealing operates too slowly. It has been found that solid particles in the sealant can be replaced with the use of a pure liquid as the sealant. Liquid flows into all cracks and openings whether large or minutely small. The components of the liquid are such that the application of heat, such as by starting the engine, solidifies the liquid and thereby operates to close or seal the cracks.

An object of the present invention is to provide a sealing system for cracked combustion engines.

A further object of the present invention is to provide a sealing system having sufficient strength and durability to withstand the operating pressures found in combustion engines.

A still further object of the present invention is to provide a system characterized by quickness in sealing cracks notwithstanding the size of the cracks.

SUMMARY OF THE INVENTION

In accordance with the present invention, a sealing system includes a liquid carrier for solid particles. The liquid carrier itself is capable of solidification. Thus, the invention utilizes the advantages of initially closing large cracks and openings with solid particles and utilizing a specified liquid to fill tiny cracks and to complete the filling of the large cracks upon solidification of the liquid.

In another embodiment of the present invention, the sealant includes a mixture of sodium silicate, potassium silicate, a glycol, particulates, coloring agents, and preservatives.

Another embodiment of the present invention includes repairing a coolant system associated with an engine for a vehicle including disconnecting a gooseneck connected to the engine and removing from the engine its thermostat; disconnecting a bottom radiator hose connected to the engine and flushing the engine with water; reconnecting the bottom radiator hose and reconnecting the gooseneck; refilling the engine's radiator with an antifreeze solution; opening a drain valve on the radiator and allowing a predetermined amount of coolant to drain out of the engine corresponding to a volume of a treatment composition to be added, the treatment composition comprising an aqueous silicate mixture comprising 50%–80% sodium silicate, based on a total amount of silicates in the mixture, and 50%–20% potassium silicate, based on the total amount of silicates in the mixture, the total amount of silicates comprising about 40%–50% of the mixture, a glycol in an amount of at least 10% by volume of the composition and the balance being water; starting the engine when the engine is cold, and turning on the engine's heater; adding the composition to the radiator of the engine while the engine is cold and idling; running the engine until the composition causes leakage and/or vapor in the engine's exhaust stream is substantially stopped; and stopping the engine and allowing the engine to cool.

The apparatus and method of the present invention, for repairing a coolant system associated with an engine for a vehicle, include means and method for providing the affirmative elements as follows:

1. Check circulation to be certain circulation is free flowing before starting repair.
2. Disconnect thermostat housing and remove thermostat. Flush cooling system with water or flushing agent after removing bottom radiator hose or opening the petcock.
3. Reconnect the bottom radiator hose, or close petcock, and reconnect thermostat housing using a new gasket.
4. Check engine must be cold, turn the heater to maximum.
5. Preferably, raise the front of the vehicle 12–18 inches. Using an antifreeze solution, pre-mix the required amount of the composition of the present invention together with the antifreeze solution. If possible do not use extended life antifreeze. Shake well. Preferably, pour the pre-mixed solution into the radiator first, then top off the radiator with additional antifreeze solution until the system is free of air. Alternatively, add the antifreeze solution and after you start the engine, add the recommended amount of the composition of the present invention directly into the radiator.
6. Tighten the radiator cap back on using a radiator cap with an air release stem. Alternatively, use a regular radiator cap or leave the radiator cap off.
7. Start engine and get temperature between 130–210 degrees Fahrenheit. While engine is running, bleed the air out of the radiator cap or bleeder valve as it accumulates. Alternatively, in the event the radiator cap is off, the cooling system will purge itself of air. Continue this process until leak/steam has stopped.
8. After the leak has stopped, the engine should be stopped and allowed to cool.
9. After the engine is cool, start it again and be certain that the temperature reaches 130–210 Fahrenheit. Repeat this step two additional times within the same day.
10. After the last time, let the engine cool and reinstall the thermostat, preferably a new thermostat. After the thermostat has opened, release all air within the system and top off the radiator with antifreeze solution. Replace the radiator cap on tight and drive vehicle as usual.

It has been found that the preferred embodiment of the present invention includes the following elements:

1. Locate the cylinder causing the bubbling in the overflow tank or backpressure.
2. Check circulation to be certain circulation is free flowing before starting repair.
3. Disconnect thermostat housing and remove thermostat. Flush cooling system with water or flushing agent after removing bottom radiator hose or opening the petcock.
4. Reconnect the bottom radiator hose, or close petcock, and reconnect thermostat housing using a new gasket.

5. Check engine must be cold, turn the heater to maximum.
6. Preferably, raise the front of the vehicle 12–18 inches. Using an antifreeze solution, pre-mix the required amount of the composition of the present invention together with the antifreeze solution. If possible do not use extended life antifreeze. Shake well. Preferably, pour the pre-mixed solution into the radiator first, then top off the radiator with additional antifreeze solution until the system is free of air. Alternatively, add the antifreeze solution and after you start the engine, add the recommended amount of the composition of the present invention directly into the radiator.
7. Before starting the engine, remove the spark plug from the cylinder that was causing the bubbling in the overflow tank or backpressure. If accessible, remove the fuel injector wire from the cylinder. Limit the amount of unburned fuel going into the combustion chamber.
8. Tighten the radiator cap back on using a radiator cap with an air release stem. Alternatively use a regular radiator cap or leave the radiator cap off.
9. Start engine and get temperature between 130–210 degrees Fahrenheit. While engine is running, bleed the air out of the radiator cap or bleeder valve as it accumulates. Alternatively, in the event the radiator cap is off, the cooling system will purge itself of air. Continue this process until leak/steam has stopped.
10. After the leak has stopped, the engine should be stopped and allowed to cool.
11. After the engine is cool, start it again and be certain that the temperature reaches 130–210 Fahrenheit. Repeat this step two additional times within the same day.
12. After the last time, let the engine cool and reinstall the thermostat, preferably a new thermostat. After the thermostat has opened, release all air within the system and top off the radiator with antifreeze solution. Replace the radiator cap on tight and drive vehicle as usual.

DETAILED DESCRIPTION

The present invention provides a method and composition for sealing holes or cracks in engine cooling systems effectively and for sealing warped engine heads. The invention provides a method and liquid composition which may be solidified to seal cracks, holes, and warped areas. In one aspect, the composition includes pumice particles or metal filings, coloring agents, and preservatives. The solid particles function as bonding agents to which the liquid becomes attached while solidifying. The solidification of the carrier takes place such that a reactant or catalyst is added to the liquid carrier immediately after time of insertion, thereby causing a chemical reaction to form solidification. In the preferred form of the present invention, solidification takes place as a result of heat applied to the liquid carrier.

By utilizing heat to cause solidification, the invention particularly is useful for sealing cracks or holes in a combustion engine in its cooling system. For example, the invention is utilized for sealing cracked or warped heads or blown head gaskets in an engine or for sealing heating cores, freeze plugs, radiators or otherwise in the cooling system. In one aspect, the engine or cooling system is a gasoline or diesel type such as those used in vehicles such as cars, trucks, and boats.

In the present invention, a liquid part of sealant is obtained by mixing sodium silicate and potassium silicate in liquid form, to which is added a glycol and water. In one aspect, the liquid contains various coloring agents and preservatives. In some applications, the liquid contains particulates such as pumice or corrosion-resistant metal filings.

The silicates of the present composition include potassium silicate and sodium silicate. The silicates are high grade silicates and may be mixed in specific proportions. For example, sodium silicate may be present in 10%–90% based on the total amount of the silicates, more preferably 50%–80% based on the total amount of silicates, the balance of the silicates being comprised of potassium silicate. The total amount of silicates comprise about 40%–50% of the aqueous silicate mixture.

Sodium silicate or water glass may be pure sodium metasilicate or mixtures of sodium metasilicate with two other silicates. It is available as granular, crystals, or 40% Baume solution. The N Grade liquid is preferred.

Sodium silicate is a term applied to a group of materials. They are compositions in which sodium oxide is combined with various amounts of silica, usually with some water. They differ in $SiO_2/Na_2O$ ratio and in the amount of water attached. Sodium silicates are available in $SiO_2/Na_2O$ from 0.5 to 4. The number of water molecules per one molecule of sodium silicate varies from 0 to 10.5.

The silicate mixture of the present invention is provided in liquid form. The potassium silicate of the present invention may be $K_2SiO_3$, $K_2SiO_5$, and/or $K_2Si_4O_9$. Preferably, the potassium silicate is present in liquid form, such as solubilized in water. The potassium silicate of the present invention may be in a 40% solution, or a soluble form. The amount of potassium silicate suitable for use in the present invention is from about 10–90% based an the total amount of silicates, more preferably, 20–50% based on the total amount of silicates. The balance being comprised of sodium silicate.

The composition also contains a glycol in water. Suitable glycols for use in the invention include diethylene glycol, ethylene glycol, propylene glycol, dipropylene glycol, polyglycols, glycol ethers, and mixtures of diethylene glycol, ethylene glycol, propylene glycol, dipropylene glycol, polyglycols, and glycol ethers. In one aspect, diethylene glycol is preferred. Glycols provide a composition with a low freezing point and lubrication for the water pump. A composition containing about 12–15 wt % glycol, for example, is used in climates with temperatures down to about –10° F. (about –23° C.). In a preferred embodiment of the invention, the glycol component comprises 1–25 wt % of the composition. More preferably, the diethylene glycol and water comprises 5–25 wt % of the total composition. Most preferably, the diethylene glycol and water comprises 10–15 wt % of the total composition. The diethylene glycol is particularly advantageous since this additive allows for a cooler running system and helps the hardening effect of the sealant.

The composition may contain particulates such as pumice or corrosion-resistant metal filings. The pumice particles should be small enough to pass through a heating core of the engine in need of sealing. In general, pumice is added to the composition for heavy-duty applications such as for sealing warped heads. Pumice particles preferably are added in an amount of about 1 teaspoon per pint. Metal filings, such as brass filings, copper filings, or aluminum filings also are used in the composition. The non-corrosive metal filings have the advantage of not rusting. Metal filings are sized to pass through the heating core of the engine to be treated. The amount of metal filings is preferably about one half of a level teaspoon per pint.

The composition of the present invention also includes coloring agents and preservatives.

In a preferred embodiment of the invention, approximately 5.3 fluid ounces (about 150 mL) of sodium silicate solution is mixed with about 2 fluid ounces (about 59 mL) of potassium silicate. To this mixture, 2 fluid ounces (about 59 mL) of a glycol, such as diethylene glycol or ethylene glycol are added and 6.7 fluid ounces (about 205 mL) of water complete the 16 ounce (about 473 mL) solution. Pumice (1 tsp) or metal filings (½ tsp) are added for severe cracks, such as for sealing warped heads and blown head gaskets. The viscosity of the product resembles a light grade motor oil. The final mixture then is bottled in an amount intended for single use, or multiple uses. For single use bottles, the amount of the composition is about 1 pint (473 mL). This final mixture is added to the cooling system of a car. The cooling system of a modern car has 10 to 20 quarts (9.5 to 19 L) coolant capacity. The mixture within the cooling system contains therefore from about 2.5 to 5% silicate by volume.

It is understood that the invention may be practiced with other amounts of the preferred materials or with the substitution of other materials. The preferred example, however, is particularly suitable because it results in solidification quickly taking place upon the reaching of the predetermined temperature. For example, when a temperature of about 150–190° F. (about 65–88° C.) is reached, solidification takes place in as little as about 5–10 seconds.

Advantageously, the high temperature necessary for solidification is obtained by starting the engine to heat the engine. In order to use the composition to seal cracks in an engine coolant system and to seal warped heads, the sealant is poured into a cold radiator so that by the time the engine is turned on the sealant has already flowed into the block and filled the cracks. Preferably, the thermostat is removed when using the composition. Once the composition has been added to the coolant system and allowed to flow into the block, the engine is started to allow the engine to warm up. Alternatively, the composition may be added to a running engine provided it is added when the engine is cold. The engine is allowed to run with the heater turned to maximum. The warmth of the engine allows the composition to seal gaps, spaces, and cracks. After the leaking stops, the engine should be stopped and allowed to cool. The sealant has been found to form a substantially permanent barrier, and the leak is cured.

In many cases, leaks are detected when the engine is running. Visible vapor may come from the exhaust. A warped head or broken block may allow coolant to leave the block in a visible stream or drops. Sealing takes about ten minutes and may be confirmed visibly by the absence of the vapor or liquid previously noticed.

In a preferred embodiment, the composition is used as follows:

(1) The engine gooseneck is disconnected and the thermostat removed. The engine then is flushed with water after removing the bottom radiator hose. A flushing agent should not be used.

(2) The bottom radiator hose is replaced, and the gooseneck is reconnected, preferably with a new gasket and sealer. The cooling system then is refilled with antifreeze mixture, preferably factory recommended, 50% antifreeze and 50% water.

(3) The appropriate amount of composition is determined based on the number of cylinders in the engine: for a 4 cylinder engine, about 16 oz. is preferred; for a 6 cylinder engine, about 24 oz. is preferred; for an 8 cylinder engine, about 32 oz is preferred.

(4) The petcock is opened so that enough coolant is drained to allow the appropriate amount of composition to be added. For engines with only a reservoir feed into the radiator, enough coolant is drained so that the recommended amount of composition does not remain in the reservoir.

(5) The engine should be cold. The motor then is started, and the heater is turned on to maximum. The composition should be shaken or stirred thoroughly to mix the contents of the composition.

(6) While the engine is cold and idling, the composition should be added into the radiator. The radiator cap preferably is left off. The engine should be held at about 1000 rpm for about 15–30 minutes, or until the leak and/or vapor has stopped. The engine is allowed to run until the composition completely seals. For severe conditions, about 25% more composition is used.

(7) If liquid is being pushed out through the radiator cap opening, the cap may be replaced. However, the cap should not be replaced under pressure unless it is necessary to stop the overflow. It is preferred to maintain the radiator level of coolant. Therefore, one may add coolant mix, if necessary, to maintain the appropriate level of coolant in the radiator and avoid overheating.

(8) Once leaking has stopped, the engine should be stopped and allowed to cool.

(9) After about 10 hours of driving, a new thermostat may be installed. Thereafter, the vehicle may be operated normally.

If desired, a slightly larger quantity of water can be used. However, the mixture of the water and silicates in the amounts indicated gives best results. It is preferred that the water and silicates are mixed together before being mixed with the glycol because the glycol will promote immediate solidification. If solid particles are included, it is possible to seal leaks at temperatures less than about 37° C. with this mixture.

The invention is characterized by a seal having great strength and integrity sufficient to withstand the normal pressures to which it would be subjected. A particularly great advantage is the quickness or speed in which the sealing action takes place. A further advantage is the ability of the sealant to penetrate tiny cracks and thereby prevent such cracks from getting larger.

The apparatus and method of the present invention for repairing a coolant system associated with an engine for a vehicle, include means and method for providing the affirmative elements as follows:

1. Check circulation to be certain circulation is free flowing before starting repair.
2. Disconnect thermostat housing and remove thermostat. Flush cooling system with water or flushing agent after removing bottom radiator hose or opening the petcock.
3. Reconnect the bottom radiator hose, or close petcock, and reconnect thermostat housing using a new gasket.
4. Check engine must be cold, turn the heater to maximum.
5. Preferably, raise the front of the vehicle 12–18 inches. Using an antifreeze solution, pre-mix the required amount of the composition of the present invention together with the antifreeze solution. If possible do not use extended life antifreeze. Shake well. Preferably, pour the pre-mixed solution into the radiator first, then top off the radiator with additional antifreeze solution until the system is free of air. Alternatively, add the antifreeze solution and after you start the engine, add the recommended amount of the composition of the present invention directly into the radiator.

6. Tighten the radiator cap back on using a radiator cap with an air release stem. Alternatively, use a regular radiator cap or leave the radiator cap off.

7. Start engine and get temperature between 130–210 degrees Fahrenheit. While engine is running, bleed the air out of the radiator cap or bleeder valve as it accumulates. Alternatively, in the event the radiator cap is off, the cooling system will purge itself of air. Continue this process until leak/steam has stopped.

8. After the leak has stopped, the engine should be stopped and allowed to cool.

9. After the engine is cool, start it again and be certain that the temperature reaches 130–210 Fahrenheit. Repeat this step two additional times within the same day.

10. After the last time, let the engine cool and reinstall the thermostat, preferably a new thermostat. After the thermostat has opened, release all air within the system and top off the radiator with antifreeze solution. Replace the radiator cap on tight and drive vehicle as usual.

It has been found that the preferred embodiment of the present invention includes the following elements:

1. Locate the cylinder causing the bubbling in the overflow tank or backpressure.

2. Check circulation to be certain circulation is free flowing before starting repair.

3. Disconnect thermostat housing and remove thermostat. Flush cooling system with water or flushing agent after removing bottom radiator hose or opening the petcock.

4. Reconnect the bottom radiator hose, or close petcock, and reconnect thermostat housing using a new gasket.

5. Check engine must be cold, turn the heater to maximum.

6. Preferably, raise the front of the vehicle 12–18 inches. Using an antifreeze solution, pre-mix the required amount of the composition of the present invention together with the antifreeze solution. If possible do not use extended life antifreeze. Shake well. Preferably, pour the pre-mixed solution into the radiator first, then top off the radiator with additional antifreeze solution until the system is free of air. Alternatively, add the antifreeze solution and after you start the engine, add the recommended amount of the composition of the present invention directly into the radiator.

7. Before starting the engine, remove the spark plug from the cylinder that was causing the bubbling in the overflow tank or backpressure. If accessible, remove the fuel injector wire from the cylinder. Limit the amount of unburned fuel going into the combustion chamber.

8. Tighten the radiator cap back on using a radiator cap with an air release stem. Alternatively use a regular radiator cap or leave the radiator cap off.

9. Start engine and get temperature between 130–210 degrees Fahrenheit. While engine is running, bleed the air out of the radiator cap or bleeder valve as it accumulates. Alternatively, in the event the radiator cap is off, the cooling system will purge itself of air. Continue this process until leak/steam has stopped.

10. After the leak has stopped, the engine should be stopped and allowed to cool.

11. After the engine is cool, start it again and be certain that the temperature reaches 130–210 Fahrenheit. Repeat this step two additional times within the same day.

12. After the last time, let the engine cool and reinstall the thermostat, preferably a new thermostat.

After the thermostat has opened, release all air within the system and top off the radiator with antifreeze solution. Replace the radiator cap on tight and drive vehicle as usual.

Make sure to run the engine two times with the spark plug out and two time with the spark plug in.

For head gaskets blown in side-by-side cylinders in six (6) and eight (8) cylinder engines, it has been found that the installation must run with both spark plugs out two times. On the third time, put spark plug in the worst cylinder and the fourth time, put the remaining spark plug in.

In extreme cases, it has been found that the preferred operation includes the element to keep the coolant level at the top of the radiator core and run without the radiator cap on.

For best results, it has been found preferred to repair mechanically, not chemically, vehicles having over three inches of coolant in oil, or losing more than 1 quart of coolant every 4 minutes out of the tail pipe.

It has been found that copious amounts of air bubbling in the overflow tank or back pressure require the following elements:

1. Check circulation to be certain circulation is free flowing before starting repair.

2. Disconnect thermostat housing and remove thermostat. Flush cooling system with water after removing bottom radiator hose. Do not use a flushing agent.

3. Reconnect bottom radiator hose, and thermostat housing using a new gasket.

4. Check engine must be cold, turn heater to maximum.

5. Raise the front of the vehicle 12–18 inches. Using factory recommended antifreeze mixture, 50% antifreeze, 50% water, pre-mix the required amount of the preferred composition with the water and antifreeze mixture. Do not use with 5-year antifreeze. Shake well. Before starting engine, pour the pre-mixed solution into the radiator first, then top off the radiator with an additional mixture of water and antifreeze until the system is free of all air.

6. Tighten the radiator cap back on using a radiator cap with an air release stem.

7. Start engine, and get temperature to 180 degrees Fahrenheit. While holding the engine RPM'S at 1,000, bleed the air out of the radiator cap as it accumulates. Continue this process for 15–30 minutes or until leak/steam has stopped.

8. After the leak has stopped, the engine should be stopped and allowed to cool.

9. After the engine is cool, start it again and be certain that the temperature reaches 180 degrees Fahrenheit for 30 minutes. Repeat this step two additional times within the same day. After the last time, let the engine cool and install a new thermostat. After the thermostat has opened, release all air within the system and top off the radiator with coolant, replace radiator cap on tight and drive vehicle as usual.

It has been found that the recommended amount per number of cylinders to be applied includes 4 cylinder—16 oz., 6 cylinder—24 oz., and 8 cylinder—32 oz.

In general, the invention applies to sealing any type of cracks wherein liquid may flow into the cracks. Cracks effectively are sealed in a rapid period of time. The cracks may be in combustion engine cooling systems or may be in other devices such as home or building heating systems.

It thus will be seen that the objects set forth above, among those made apparent from the preceding description, are attained efficiently and, since certain changes may be made in carrying out the apparatus and method set forth without departing from the spirit and scope of the invention, it is intended that all matter contained in the above description and shown in the accompanying drawings shall be interpreted as illustrative and not in a limiting sense.

The invention in its various embodiments thus provides a sealant which is particularly effective for cracks and leaks at various ranges of temperatures.

What is claimed is:

1. A method of repairing a coolant apparatus on an engine for a vehicle, comprising:
    a) circulating a coolant in a closed, free flowing cooling apparatus;
    b) disconnecting and removing a thermostat housing from the cooling apparatus and flushing the cooling apparatus with water or flushing agent after removing a bottom radiator hose or opening a petcock;
    c) reconnecting the bottom radiator hose or closing the petcock, and reconnecting the thermostat housing using a new gasket;
    d) providing an engine at a cold temperature and turning a heater to maximum on the engine;
    e) raising a front end of a vehicle holding the engine to an elevation of about 12–18 inches and using an antifreeze solution to pre-mix a predetermined composition together with an antifreeze solution, pouring the pre-mixed solution into a radiator in the cooling apparatus first, then topping off the radiator with additional antifreeze solution until the cooling system is free of air;
    f) tightening a radiator cap having air release stem;
    g) starting the engine and elevating the engine temperature to a temperature between about 130–210 degrees Fahrenheit, bleeding air out of the radiator cap or bleeder valve as air accumulates until leak/steam has stopped;
    h) stopping and cooling the engine;
    i) starting the cooled engine again and elevating the temperature to about 130–210 Fahrenheit, repeating step (g) two additional times within the same day; and
    j) after the third step (g), cooling the engine and reinstalling a new thermostat.

2. A method as set forth in claim 1, further comprising after the thermostat has opened, releasing all air within the cooling apparatus and topping off the radiator with antifreeze solution.

3. A method as set forth in claim 2, further comprising replacing the radiator cap on tight and driving the vehicle normally.

4. A method as set forth in claim 3, further comprising locating a cylinder causing bubbling in an overflow tank or backpressure.

5. A method as set forth in claim 4, further comprising before starting the engine, removing the spark plug from the cylinder causing the bubbling in the overflow tank or backpressure, and if accessible, removing a fuel injector wire from the cylinder, thereby limiting the amount of unburned fuel going into the combustion chamber.

6. A method as set forth in claim 5, further comprising tightening the radiator cap back on using a radiator cap with an air release stem, or use a regular radiator cap and leave the radiator cap off.

7. A method as set forth in claim 1, further comprising locating a cylinder causing bubbling in an overflow tank or backpressure.

8. A method as set forth in claim 1, further comprising locating a cylinder causing bubbling in an overflow tank or backpressure.

9. A method as set forth in claim 8, further comprising before starting the engine, removing the spark plug from the cylinder causing the bubbling in the overflow tank or backpressure, and if accessible, removing a fuel injector wire from the cylinder, thereby limiting the amount of unburned fuel going into the combustion chamber.

10. A method as set forth in claim 1, further comprising locating a cylinder causing bubbling in an overflow tank or backpressure.

11. A method as set forth in claim 10, further comprising before starting the engine, removing the spark plug from the cylinder causing the bubbling in the overflow tank or backpressure, and if accessible, removing a fuel injector wire from the cylinder, thereby limiting the amount of unburned fuel going into the combustion chamber.

12. A method as set forth in claim 1, further comprising raising a front of a vehicle holding the engine to an elevation of about 12–18 inches, pouring a pre-mixed solution into a radiator in the cooling apparatus first, then topping off the radiator with additional antifreeze solution until free of air.

13. A method as set forth in claim 1, further comprising raising a front of a vehicle holding the engine to an elevation of about 12–18 inches, pouring a pre-mixed solution into a radiator in the cooling apparatus first, then topping off the radiator with additional antifreeze solution until free of air.

14. A method as set forth in claim 1, further comprising starting the engine and elevating the engine temperature to a temperature between about 130–210 degrees Fahrenheit, bleeding air out of the radiator cap or bleeder valve as air accumulates until leak steam has stopped.

15. A method as set forth in claim 14, further comprising stopping and cooling the engine.

16. A method as set forth in claim 15, further comprising starting the cooled engine again and elevating the temperature to about 130–210 Fahrenheit and repeating two additional times within the same day.

* * * * *